United States Patent
Gazyakan et al.

[11] Patent Number: 6,006,870
[45] Date of Patent: Dec. 28, 1999

[54] DISC BRAKE ARRANGEMENT FOR AN INDIVIDUAL WHEEL DRIVE

[75] Inventors: Ünal Gazyakan; Michael Roske, both of Friedrichshafen, Germany

[73] Assignee: ZF Friedrichshafen AG, Friedrichshafen, Germany

[21] Appl. No.: 09/018,134

[22] Filed: Feb. 3, 1998

[30] Foreign Application Priority Data

Mar. 8, 1997 [DE] Germany ............................ 197 09 588

[51] Int. Cl.$^6$ .................................................. F16D 55/08
[52] U.S. Cl. ........................... 188/72.1; 180/65.6; 475/331
[58] Field of Search ................................. 475/151, 152, 475/331, 343; 180/65.6, 65.5; 188/72.1, 18 A, 72.4, 298

[56] References Cited

U.S. PATENT DOCUMENTS

| | | | |
|---|---|---|---|
| 3,892,300 | 7/1975 | Hapeman et al. | 192/2 |
| 4,330,045 | 5/1982 | Myers | 180/65.6 |
| 4,437,530 | 3/1984 | De Young et al. | 180/75 |
| 4,553,644 | 11/1985 | Folch | 188/72.4 |
| 4,843,910 | 7/1989 | Loeber et al. | 188/18 A X |
| 5,472,059 | 12/1995 | Schlosser et al. | 180/65.5 |
| 5,769,751 | 6/1998 | Forster | 475/346 |

FOREIGN PATENT DOCUMENTS

| | | | |
|---|---|---|---|
| 2109372 | 2/1976 | Germany | 180/65.6 |
| 26 30 206 C2 | 3/1978 | Germany . | |

*Primary Examiner*—Mark T. Le
*Assistant Examiner*—Pamela J. Lipka
*Attorney, Agent, or Firm*—Davis and Bujold

[57] ABSTRACT

The invention relates to a disc brake arrangement for an individual wheel drive with rear-mounted planetary gear (3) for motor vehicles. A brake (7) is designed as pneumatically or hydraulically actuated disc brake and acts as a service, parking, emergency and auxiliary brake. The brake caliper (8) is situated below the horizontal center line of the wheel. The brake actuating device (9) is a combined diaphragm and spring accumulator cylinder situated in the axial direction and when the wheel head is assembled lies protected in a hollow axle body (10). An emergency release device (11) of the parking brake, which in case of failure of the vehicles own pressurized air system, allows towing, and is accessible from below through a hole (12) of the axle body (10).

10 Claims, 2 Drawing Sheets

DISC BRAKE ARRANGEMENT FOR AN INDIVIDUAL WHEEL DRIVE

FIELD OF THE INVENTION

The invention relates to a disc brake arrangement for an individual wheel drive with rear-mounted planetary gear for motor vehicles. Individual wheel drives with rear-mounted planetary gear are known already, one example of such wheel drives having been given in German Patent No. 26 30 206.

BACKGROUND OF THE INVENTION

Such individual wheel drives with rear-mounted planetary gear can be used, for example, in local traffic buses. Since in this drive, the otherwise usual axle bridge housing for axle drive and differential are omitted and replaced by an axle body without interior shafts or an individual wheel suspension, it is possible to build buses having very low floor height. In the former driving arrangements for low floor buses with individual wheel drives, the arrangement of the actuating device for disc brakes proves disadvantageous, since it reduces the passage in the floor of the bus to the height of the wheels.

SUMMARY OF THE INVENTION

The problem, on which the invention is based, is to provide an individual wheel drive with disc brakes which are reduced in the axial direction so that the passage in the floor of a low-floor bus is not unduly restricted by the axial length of the wheel assembly.

The brake caliper is here situated below the horizontal center line of the wheel. The brake-actuating device is situated in the axial direction in a hollow axle body. When the wheel head is assembled, it is protected against shocks by its position inside the hollow axle body. This disc brake arrangement can be advantageously used particularly in individual wheel drives for low-floor buses.

In an advantageous embodiment of the invention, the brake caliper is situated below the horizontal center line of the wheel in a circular sector between 150° and 210° of the vertical. Here the normal vector of the circular disc points in direction to the wheel axle. The angle is measured by the radius vector pointing vertically upward, that is, in the direction of the vertical axis of the vehicle.

The brake-actuating device is preferably designed as a combined diaphragm and spring accumulator cylinder. The brake is designed as a pneumatical or hydraulically actuated disc brake. It acts in the same manner as a service, parking, emergency and auxiliary brake.

The parking brake advantageously has an emergency release device which is accessible from below through a hole in the axle body. In case of failure of the vehicle's own pressurized air system, the emergency release device may be used in order to make it possible to tow the vehicle.

In this disc brake arrangement for an individual wheel drive, the input is preferably electric. A possible field of use of this disc brake arrangement is in electrically driven rear wheels combined with rigid axle systems for dual or single tires.

In an advantageous embodiment of the invention, the input power of a large electromotor is provided by several smaller ones. Their respective input power is combined by a spur gear assembly. The individual, small electromotors have a small axial length so that the whole drive unit projects less in the direction to the interior of the bus. The passage width in the interior of the vehicle limited by the height of the wheels is thus increased without increasing total width of the vehicle. This drive is adapted to the required wheel torque and the wheel speed by a rear-mounted planetary gear. The distribution of the input power of the individual wheel drive over several electromotors of less power, which are shorter than the motors of more power, offers, together with the reduction of the total length of the individual wheel drive, still other advantages. In case of failure of a prime mover in the wheel head, operation with the remaining motors is still possible. Besides, advantages in cost result from the use of motors belonging to the efficiency class of passenger car prime movers and thus can be mass produced.

The spur gear on the output side of the spur gear assembly is preferably connected by a shaft with the sun gear of the planetary gear. The wheel bearing which rotatably supports the wheel hub is situated axially between the spur gear assembly drive and the planetary gear. The rims are fastened on the wheel hub.

In an advantageous embodiment of the invention, the electromotors can be separately regulated. This makes possible a higher efficiency in the part load area compared to a one-motor individual wheel drive.

The prime mover(s) is (are) preferably cooled by air, water, oil or other means.

BRIEF DESCRIPTION OF THE DRAWINGS

The invention is illustrated, by way of example, in the drawings, which show.

DESCRIPTION OF THE PREFERRED EMBODIMENTS

Figure 1:
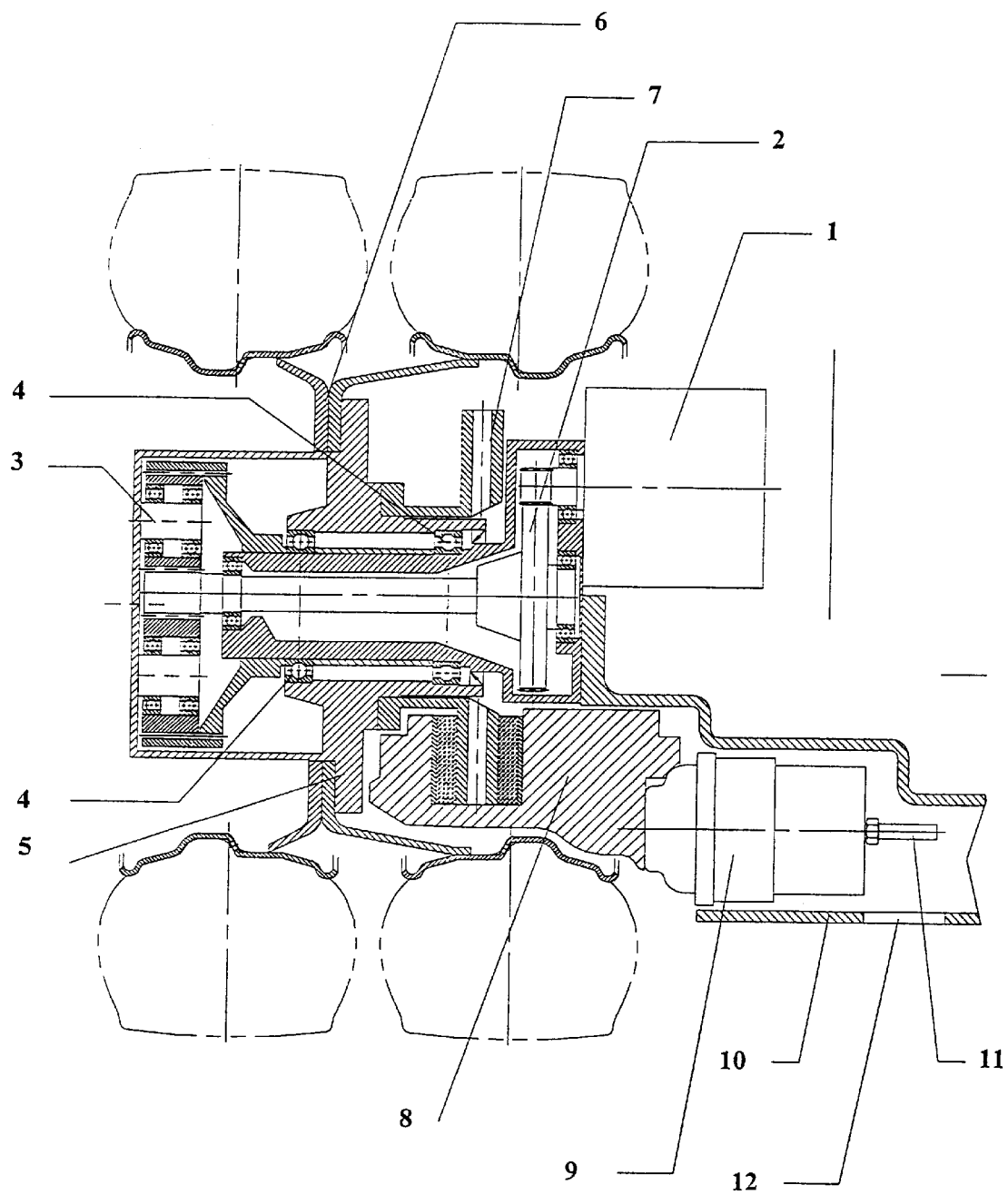
FIG. 1 is a section through an individual wheel drive with a disc brake arrangement in which the brake-actuating device is situated in a hollow axle body.
Figure 2:
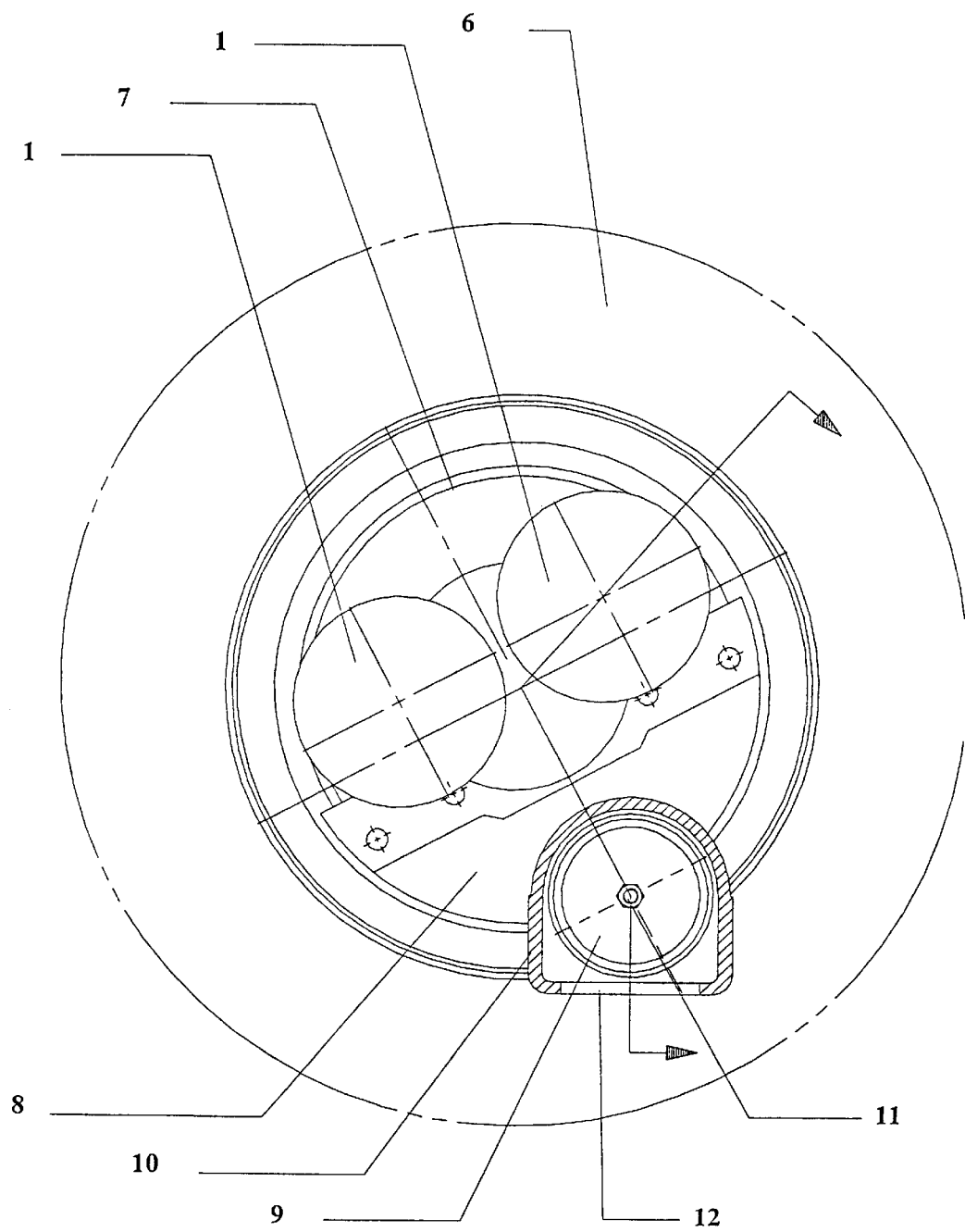
FIG. 2 is a section perpendicular to the wheel axle of FIG. 1 through an individual wheel drive with two motors and with a disc brake arrangement.

In one embodiment of the invention, two prime movers 1 drive a spur gear assembly 2 which is connected by a shaft with the sun gear of a planetary gear 3. The ring gear of the planetary gear 3 is stationary. The planet carrier drives two rims 6 via a wheel hub. The wheel bearing 4, which rotatably supports the wheel hub 5, is mounted axially between spur gear assembly 2 and planet gear 3. One brake 7, preferably a pneumatically actuated disc brake, performs the service, parking, emergency and auxiliary brake functions. The brake caliper 8 is situated below the horizontal center line of the wheel. It is in a circular sector between 150° and 210° of the vertical vector passing through the wheel axis. The brake-actuating device 9 is a combined diaphragm and spring accumulator cylinder, which is disposed in the axial direction and the wheel hub, lies protected in a hollow axle body 10. In a technical variant of this, the brake 7 is hydraulically actuated. An emergency release device 11 of the parking brake, which in case of failure of the vehicle, makes possible towing of the vehicle, is accessible from below through a hole 12 of the axle body 10.

REFERENCE NUMERALS 1 prime mover
2 spur gear assembly
3 planetary gear
4 wheel bearing
5 wheel hub 6 rim
7 brake
8 brake caliper
9 brake-actuating device
10 axle body
11 emergency release device
12 hole

We claim:

1. An individual wheel drive for a vehicle having at least one planetary gear (3) connected to drive the wheel drive, one wheel bearing (4) supporting the wheel for rotation, one brake (7) disc for braking the wheel, one brake caliper (8) for braking the disc and one brake-actuating device (9) for operating the caliper, wherein said brake caliper (8) is situated substantially below the horizontal center line of the wheel and said brake-actuating device (9) is situated in a hollow axle body located axially inwardly of the wheel drive relative to the vehicle.

2. The individual wheel drive according to claim 1, wherein said brake caliper is situated entirely beneath the horizontal center line of the wheel in a circular sector between 150° and 210° of a vertical direction of the vehicle.

3. The individual wheel drive according to claim 1, wherein said brake-actuating device (9) is designed as combined diaphragm and spring accumulator cylinder.

4. The individual wheel drive according to claim 1, wherein said brake (7) is a pneumatically and hydraulically actuated disc brake and acts as a service, parking, emergency and auxiliary brake.

5. The individual wheel drive according to claim 1, wherein the wheel is powered by at least one electrical motor.

6. The individual wheel drive according to claim 1, wherein the power is provided by at least two prime movers (1) operating by way of a spur gear assembly (2).

7. The individual wheel drive according to claim 6, wherein said spur gear assembly (2) is connected by a shaft with a sun gear of said planetary gear (3) and that said wheel bearing (4) is situated axially between said spur gear assembly (2) and said planetary gear (3).

8. The individual wheel drive according to claim 6, wherein said prime movers (1) are separately regulated.

9. An individual wheel drive for a vehicle having at least one planetary gear (3) connected to drive the wheel drive, one wheel bearing (4) supporting the wheel for rotation, one brake (7) disc for braking the wheel, one brake caliper (8) for braking the disc and one brake-actuating device (9) for operating the caliper, wherein said brake caliper (8) is situated below the horizontal center line of the wheel and said brake-actuating device (9) is situated in a hollow axle body located axially inwardly of the wheel drive relative to the vehicle, wherein a parking brake has an emergency release device (11) accessible from below through a hole (12) in the axle body (10).

10. An individual wheel drive for a vehicle having at least one planetary gear (3) connected to drive the wheel drive, one wheel bearing (4) supporting the wheel for rotation, one brake (7) disc for braking the wheel, one brake caliper (8) for braking the disc and one brake-actuating device (9) for operating the caliper, wherein said brake caliper (8) is situated below the horizontal center line of the wheel and said brake-actuating device (9) is situated in a hollow axle body (10) located axially inwardly of the wheel drive relative to the vehicle, the hollow axle body being situated substantially below the horizontal center line of the wheel.

* * * * *